United States Patent [19]

Shimoyama et al.

[11] Patent Number: 4,656,818
[45] Date of Patent: * Apr. 14, 1987

[54] PACKAGING MACHINE

[75] Inventors: Mamoru Shimoyama; Isamu Hoshina, both of Gunma, Japan

[73] Assignee: Orihiro Kabushiki Kaisha, Japan

[ * ] Notice: The portion of the term of this patent subsequent to Mar. 26, 2002 has been disclaimed.

[21] Appl. No.: 688,955

[22] Filed: Jan. 4, 1985

Related U.S. Application Data

[63] Continuation-in-part of Ser. No. 486,100, Apr. 18, 1983, Pat. No. 4,506,494.

[51] Int. Cl.⁴ .......................... B65B 9/12; B65B 51/14; B65B 51/32
[52] U.S. Cl. .......................................... 53/551; 53/373
[58] Field of Search ................... 53/551, 552, 51, 373, 53/389; 156/269, 308.4, 498

[56] References Cited

U.S. PATENT DOCUMENTS

| | | | |
|---|---|---|---|
| 2,960,808 | 11/1960 | Pike | 53/551 X |
| 3,149,447 | 9/1964 | Dorr | 53/551 |
| 3,332,204 | 7/1967 | Frank | 156/498 X |
| 3,611,657 | 10/1971 | Inoue et al. | 53/551 X |
| 3,703,796 | 11/1972 | Inoue et al. | 53/551 X |
| 3,738,080 | 6/1973 | Reil | 53/551 |
| 3,849,965 | 11/1974 | Dominici | 53/551 X |
| 4,127,976 | 12/1978 | Jablonski et al. | 53/551 X |
| 4,394,204 | 7/1983 | Hutcheson | 156/308.4 X |
| 4,506,494 | 3/1985 | Shimoyama et al. | 53/551 |

Primary Examiner—Horace M. Culver
Attorney, Agent, or Firm—McGlew and Tuttle

[57] ABSTRACT

A packaging machine is described which comprises a pair of squeezing guide rolls opposite each other and movable to and from a tubular plastic film, perpendicularly thereto; a pair of heat-sealing members located under the guide rolls and operating in the same manner; and a multi-purpose unit consisting of a compressing component, a cooling component and a cutting component. This unit is divided into two members operating similarly to the other parts of the machine. The film container, after having been charged is moved downwardly and guided first to the heat-sealing members, then to the compressing-cooling-cutting unit by drive rollers means. The displacements are effected for predetermined distances, so as to insure perfect sealing and severing of the containers.

2 Claims, 12 Drawing Figures

PACKAGING MACHINE

CROSS-REFERENCE TO RELATED APPLICATIONS

This application is a continuation-in-part of Ser. No. 486,100, filed Apr. 18, 1983, M. Shimoyama et al., for "Packed Bag Cutter", now U.S. Pat. No. 4,506,494.

BACKGROUND OF THE INVENTION (1) Field of the Invention

The present invention relates to an improved packaging machine for use in packaging a constant amount of a charge continuously in containers made from tubularly shaped plastic film.

(2) Description of the Prior Art

A conventional packaging machine for filling containers made from tubularly shaped plastic film, and its operating procedure will be described with reference to FIGS. 3A–3D.

Generally, tubular film 1, packed with a charge 2, is heat-sealed by members 4 at a predetermined sealing position, such as shown at 6 in FIG. 3A. To the film beneath the sealing position 6 is attached a packaged container 1a which has been previously formed. The tubular plastic film above the sealing position 6 is supplied with a filling charge 2 in a predeterminedly constant amount. A pair of squeezing rolls 3 is arranged above the heat-sealing members 4 and is located at such a position as to permit the forming of a packaged container. As shown in FIG. 3B, the squeezing rolls 3 are moved toward each other to press and divide the tubular film 1 filled with the charge 2 into a length required by one packaged container 1b. Subsequently, the squeezing rolls 3 are rotated in the direction of the arrows (FIG. 3C) to push the filled container 1b downward under the heat-sealing members. These members are then in the position shown by phantom lines and move in the direction indicated by the arrows (FIG. 3C), sealing the film above the filled container. A pair of cutting members 5 is arranged on opposite sides of the downwardly moved, sealed portion 6 (bottom or leading end of the packaged container) and the cutting members are moved toward each other to sever the previously sealed and formed container at the sealing position 6. Thereafter, the squeezing rolls 3 and the heat-sealing members 4 are, respectively, separated from each other and the charge 2 is supplied into the tubular film 1, the packaging operation being performed continuously in the same sequential manner.

Drawbacks and problems, unfortunately, arise in the use of the packaging machine described above. For example, when handling a hot charge, the sealed portion 6 may be readily torn apart due to insufficient cooling when the hot charge flows into the film (steps of FIGS. 3A and 3D), causing a loss of the charge and of the film. Further, although (see FIG. 3C) the distance L;hd 2 between the squeezing rolls 3 and the sealing members 4 and the distance $L_1$ between the sealing members 4 and the cutting members 5 are arranged so as to permit cutting of the film at the sealed portion 6, the cutting could occur in an undesirable position, thereby causing the loss of the charge and of the film and the contamination of the environment of the machine. This would lead to a reduced working efficiency, because in actual operation the length of a packaged container 1a, 1b is not necessarily constant, due to e.g. variations in the conditions of the charge's temperature, etc.

BRIEF SUMMARY OF THE INVENTION

The object of the present invention is to eliminate the disadvantages existing in packaging machines of the prior art and to simplify and improve the device claimed in Ser. No. 486,100, now U.S. Pat. No. 4,506,494, by M. Shimoyama et al. and discussed hereinafter. The present invention has as its main object the provision of a novel and improved machine which, briefly, comprises a pair of squeezing guide rolls positioned in the upper part of the machine; a pair of heat-sealing members arranged in a lower portion of the device and spaced from the guide rolls at a distance equivalent to the length of a packaged container, more or less; and a multipurpose pressing-cooling-cutting unit provided underneath and adjacent the sealing members. The squeezing guide rolls, the heat-sealing members and the pressing-cooling-cutting unit are, respectively, reciprocatingly movable perpendicularly with respect to the direction of travel of the film. The pair of squeezing guide rolls is provided with an intermittent, rotating mechanism, which displaces the heat-sealed portion of the packaged container from the sealing position very accurately to the position of the cutting component of the multi-purpose unit of the machine. This cutter is located within the unit in question and, together with the pressing and the cooling components, is positioned underneath the sealing position, thereby ensuring a proper cutting of the sealed portion and a reliably strengthening of the seal, by firmly pressing and cooling the seal.

DETAILED DESCRIPTION OF THE INVENTION

Figure 1A:
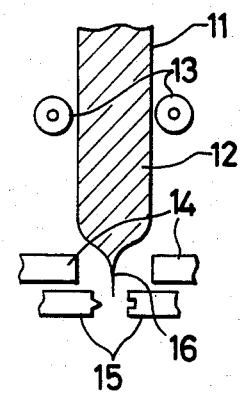
FIGS. 1A, 1B, 1C and 1D are schematic views of the packaging machine disclosed in application Ser. No. 486,100, filed Apr. 18, 1983 by M. Shimoyama et al., and issued as U.S. Pat. No. 506,494, and of its sequential operational steps.
Figure 1B:
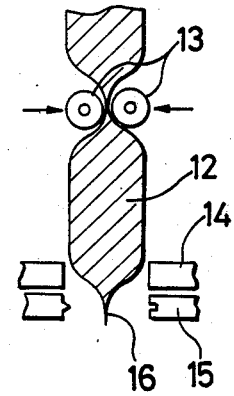
Figure 1C:
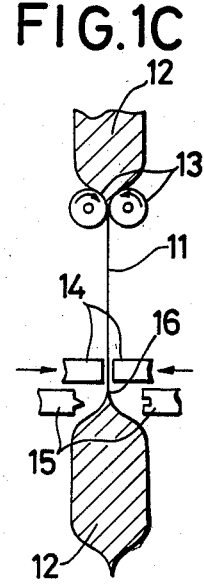
Figure 1D:
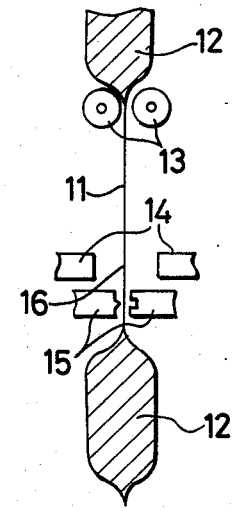

Briefly stated, according to the teachings of Ser. No. 486,100 of M. Shamoyama et al., the device comprises a pair of sequeezing rolls 13 located opposite each other in the upper part of the machine and movable horizontally to and from the film 11; a pair of heat-sealing means 14 located opposite each other beneath the squeezing rolls at a distance required for heat-sealing of a container filled with a charge 12 and movable horizontally to and from each other; and a pair of cutting means 15 also located opposite each other and positioned immediately beneath the heat-sealing means at a distance equivalent to the width of the heat-sealed area 16 and movable horizontally to and from each other. The pair of squeezing rolls 13 is provided with intermittent roll drivers (not shown) which, located above the squeezing rolls, rotate them when in the closed position so as to displace the film 11 downward for a length equivalent to one packaged container. The film is then stopped for the heat-sealing operation and then it is advanced again downward by a distance equal to the width of the seal.

There exists, however, with this arrangement of mechanical parts the difficulty of controlling exactly the cutting operation, because of the individual and separate cutting element which is often applied against a hot and insufficiently compressed sealed region of the film, although properly cooled. There is thus a great need for the perfect synchronization of the three operations of compressing, cooling and cutting, when the charge to be sealed is a particularly difficult one. The present invention will now be described with illustrative reference to the accompanying drawings.

The improved packaging machine of the invention comprises a pair of feeding rollers 20 to feed a tubular film 21 and rotatingly advancing it downwardly for predetermined distances required by the heat-sealing and the compressing-cooling-cutting operations; a pair of squeezing rolls 23 which are located underneath the feed rollers and which rotate synchronously therewith, these rolls assisting in the displacement of the film in a correct manner and serving to prevent or permit the falling of the charge into the tubular film container; a pair of heat-sealing members 24 positioned underneath the squeezing rolls at a predetermined distance required for heat-sealing properly the filled container; and a compressing-cooling-cutting unit, called also, and suitably so, a multi-purpose unit, which is located under the heat-sealing members and indicated in the drawings, generally, as numeral 25. This multi-purpose unit is located at a distance from the heat-sealing members equivalent to the width of the sealed portion 26. The squeezing rolls 23, the heat-sealing members 24 and the multi-purpose unti 25 are, respectively, provided with suitable driving means 23a, 24a and 25a, such as actuating cams, pistons, hydraulic cylinders etc. for the horizontally reciprocating displacement thereof. Suitable timing mechanisms (not shown) are provided to operate the heat-sealing members after the squeezing rolls have divided the charge 22 in the film 21 and have rotated into closed position (FIGS. 2A and 2C) to guide the film for a predetermined length. Furthermore, means (conventional, not shown) are provided to intermittently drive the rolls 23 via the feed rollers 20, so that the rolls 23 may move the sealed portion 26 downward for its predetermined length, while the heat-sealing members 24 are opening after completing their sealing function.

The operational steps of the improved machine will now be described with reference to FIGS. 2A through 2D.

Figure 2A:
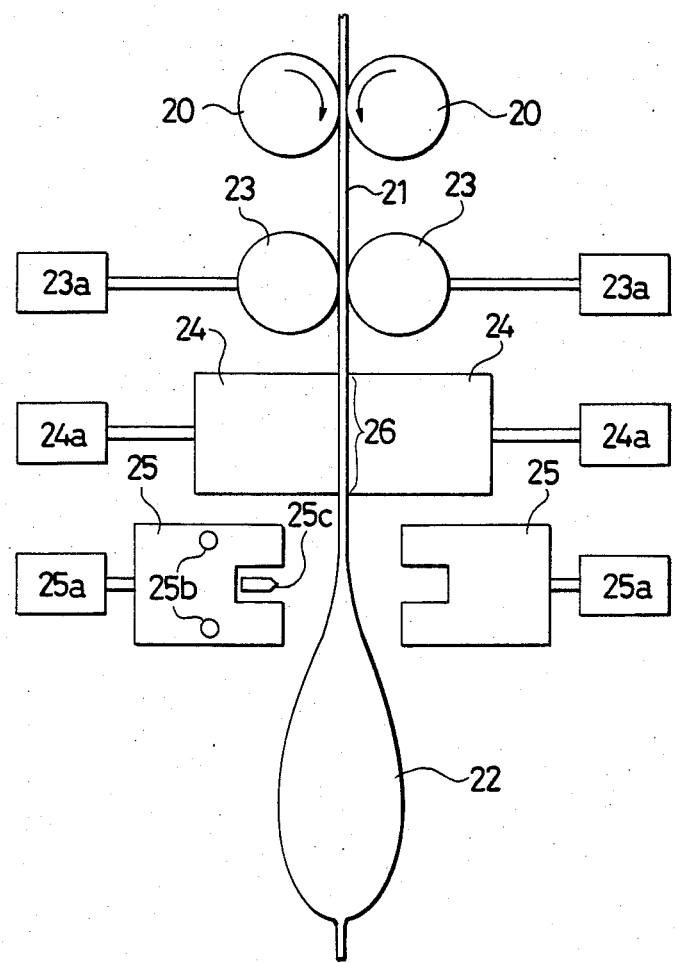
FIGS. 2A, 2B, 2C and 2D are schematic views of the improved packaging machine of the present invention, and of its sequential operational steps.

FIG. 2A shows the condition in which the film 21 has been already filled by the feeding rollers 20 with the proper dose of charge 22 and has been moved downward for a distance equivalent to the length of the filled container into sealing position. The squeezing rolls 23 are actuated in closed position by the means 23a and the sealing operation is being performed by the heat-sealers 24 which have been closed-positioned by the actuating members 24a. The sealing operation is performed in the region indicated generally at 26. The multi-purpose unit is, of course, not operative at this time.

Figure 2B:
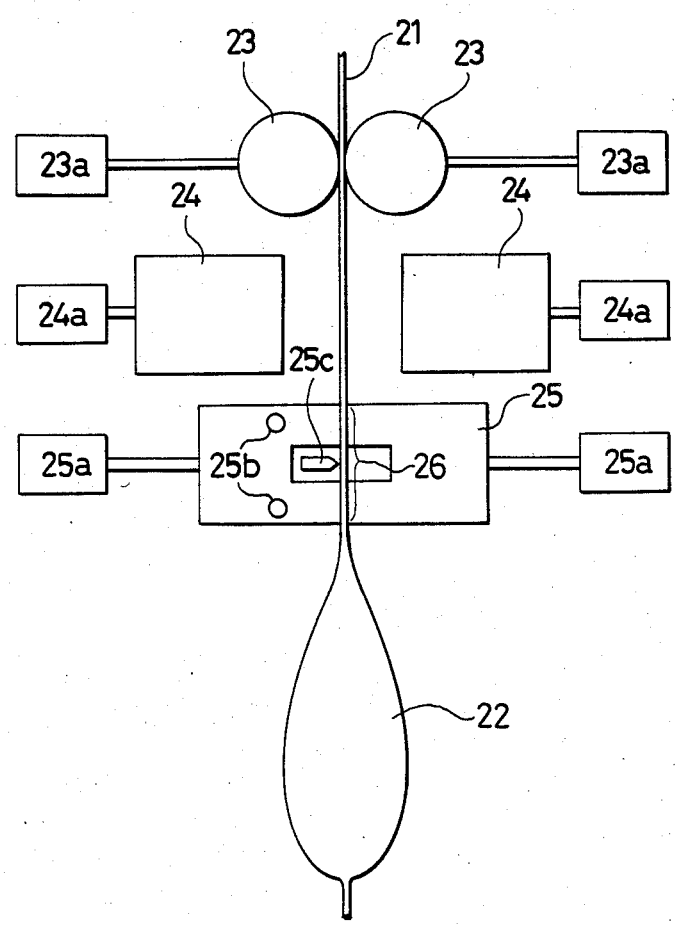

FIG. 2B shows the next operational step of the machine. The sealing has been performed and the members 24 are actuated in opened position by the means 24a, while the multi-purpose unit 25 is actuated by means 25a in closed position. The compressing and cooling components of this unit, 25b indicating the inlet and outlet ports for the coolant which may be any suitable fluid, such as water, operate in unison or synchronized, because this is a very critical operation in the filling of a container, since the charge may be a very difficult one to handle. The filled container is predeterminedly advanced downward so that the sealed portion 26 is moved from the sealing members position to the cutting position. The feed rollers perform this operation assisted by the squeezing guide rolls 23.

Figure 2C:
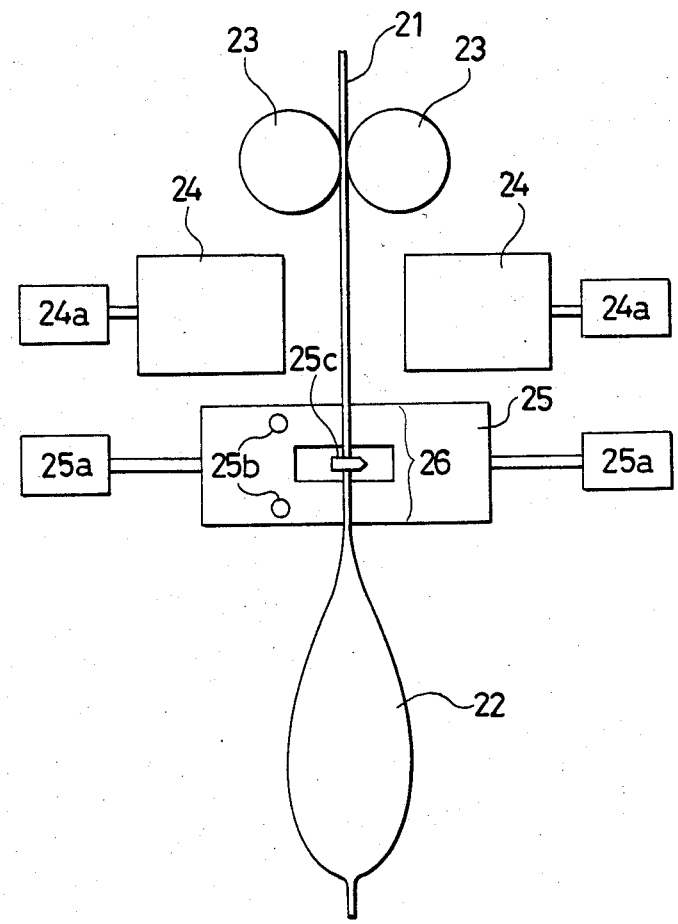

FIG. 2C shows the stage in which the compression and cooling operations are finished and, on a time-controlled basis, the cutting is performed in the sealed region of the film. The cutting component 25c of the multi-purpose unit is moved into place and the filled container, properly and securely sealed, is severed and dropped into some suitable collecting receptacle. During this phase of the operation, since the cutting component is an integral part of the unit 25, the unit remains in the closed position as indicated.

Figure 2D:
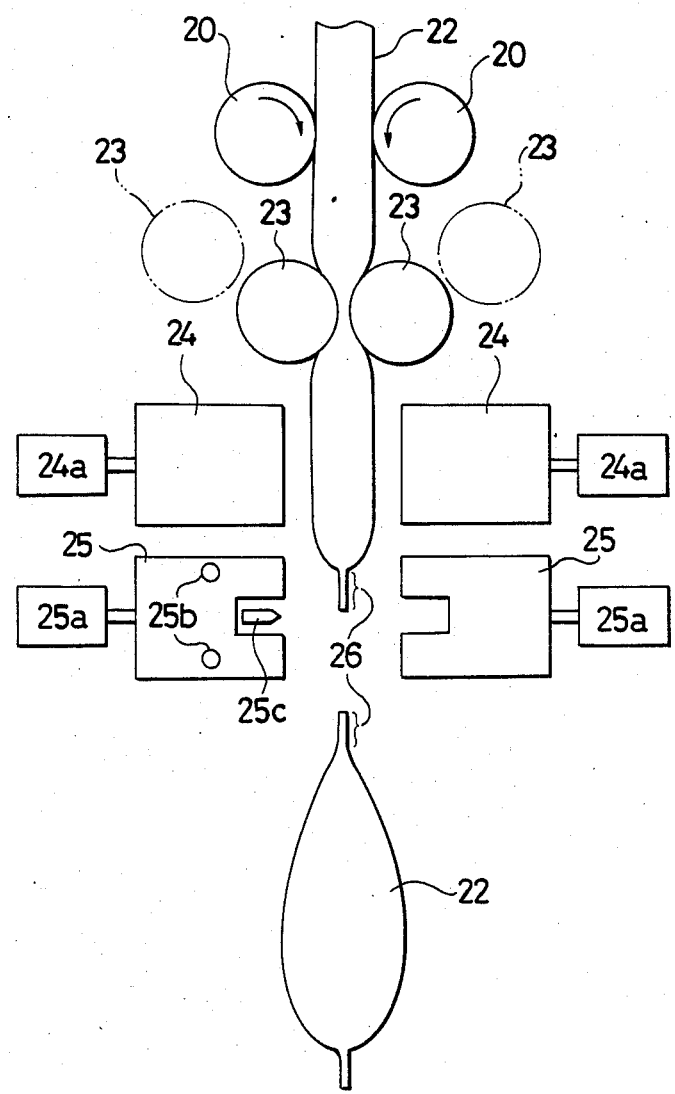
Figure 3A:
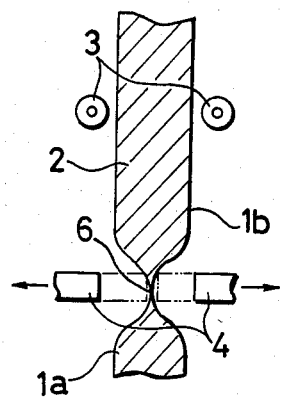
FIGS. 3A, 3B, 3C and 3D are schematic views of the sequential operational steps of a prior art packaging machine.
Figure 3B:
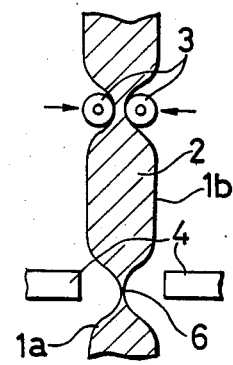
Figure 3C:
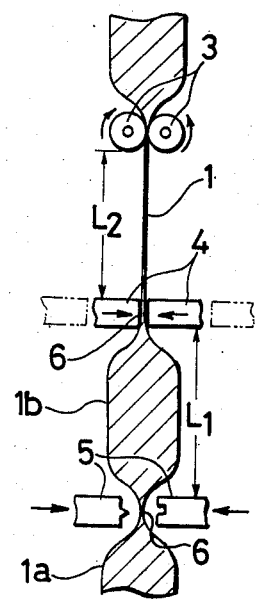
Figure 3D:
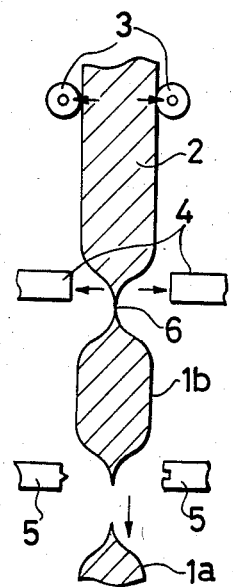

Finally, FIG. 2D shows the phase of the operation, in which the multi-purpose unit 25 is separated from the film, the film itself is advanced and since its leading end is perfectly sealed during the previous operation, the tubular film may be filled with another dose of charge 22, the squeezing rolls being moved apart to permit the feeding rollers to fill the container with the charge. The container is then moved downward by a length equivalent to the filled container and the squeezing rolls 23 are moved in the closed position as indicted in this figure. The situation represented by FIG. 2A will then come into existence and the operation will then be repeated.

As stated earlier hereabove, the charge may be liquid, viscous or paste-like and its temperature may vary over a large range because the improved sealing operation, thanks to the use of the multi-purpose unit, has been found to be reliable and safe, and the cutting of the film has been found to occur consistently in the proper region of the sealed portion 26, thus insuring that the leading edge or end of the subsequent container be safely sealed and be capable of receiving any type of charge.

Minor variances in the mechanical construction of the machine are obviously intended to be part of the concept of the invention as claimed. The description of the invention has been carried out following an illustrative prototype, which has been quite suitable and workable for industrial purposes, where both speed of operation and accuracy are necessary in order to eliminate losses in manpower and in materials. Consequently, the scope of the invention is not intended to be limited by the description, but to encompass all minor variances obvious to the person skilled in the art.

What is claimed is:

1. A packaging machine for intermittently feeding a tubular film material, filling it with a substance to be packaged and sub-dividing it into individual packages, which machine comprises the combination of:
   (a) a pair of squeezing guide rolls positioned opposite each other in the upper region of said machine and movable perpendicularly toward and away from said tubular film;
   (b) a pair of heat-sealing members positioned opposite each other, substantially spaced from and beneath said squeezing guide rolls and movable perpendicularly toward and away from said tubular film;
   (c) a multi-purpose unit having two members positioned opposite each other and movable perpendicularly toward and away from said tubular film, said multi-purpose unit comprising: (i) a compressing component, (ii) a cooling component and (iii) a cutting component; said cooling component being provided on at least one of said two members of said multi-purpose unit, said cutting component being positioned on either of said two members of said multi-purpose unit, said multi-purpose unit being positioned spaced from and neath said heat-sealing members at a distance corresponding to the width of a sealed portion of tubular film, said cutting component being operative individually and separately from the operation of said other two components of the said multi-purpose unit; and (d) means for feeding said charge to said film and rotatingly driving said squeezing guide rolls alternately, first a distance corresponding to the positioning of said tubular film in juxtaposition with said heat-sealing members and then a distance corresponding to the width of the sealed portion of said tubular film.

2. In a packaging machine for intermittently feeding a tubular film material, filling it with a substance to be packaged and subdividing it into individual packages, which machine comprises a pair of squeezing guide rolls, a pair of heat-sealing members substantially spaced from and beneath said squeezing guide rolls, means for feeding the charge to the film and rotatingly driving the squeezing guide rolls alternately, first a distance corresponding to the positioning of the film in juxtaposition with the heat-sealing members and then a distance corresponding to the width of the sealed portion of the film, the improvement consisting of a multi-purpose unit having two members positioned opposite each other and movable perpendicularly toward and away from said tubular film, said unit comprising:

(i) a compressing component;
(ii) a cooling component; and
(iii) a cutting component;

said cooling component being provided on at least one of said two members of said unit, said cutting component being positioned on either of two members of said unit, said unit being positioned spaced from and beneath said heat-sealing members at a distance corresponding to the width of a sealed portion of said tubular film, said cutting component being operative individually and separately from the operation of said two other components of said multi-purpose unit.

* * * * *